3,352,764
ABSORPTION AND DISTILLATION PROCESS FOR SEPARATING CRUDE UNSATURATED NITRILES FROM ACETONITRILE WITH SELECTIVE SOLVENT RECYCLE
Clarence M. Tyler, Berea, Ohio, assignor to The Standard Oil Company, Cleveland, Ohio, a corporation of Ohio
Filed May 2, 1966, Ser. No. 546,839
6 Claims. (Cl. 203—42)

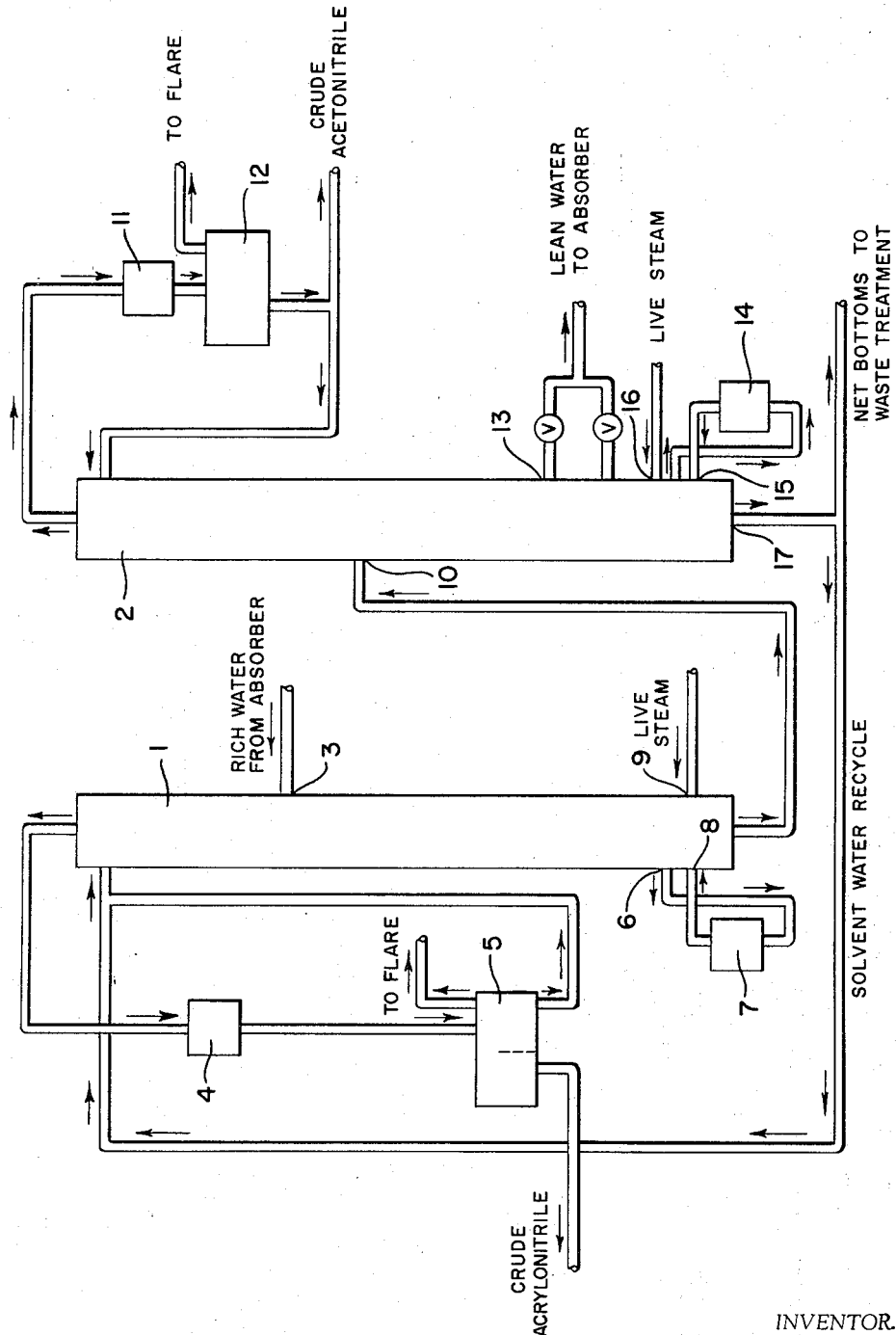

This invention relates to the separation of crude olefinically unsaturated nitriles, such as acrylonitrile and methacrylonitrile, from an aqueous solution containing saturated aliphatic nitriles such as acetonitrile, carbonyl compounds of relatively low molecular weight, and relatively soluble organic compounds of relatively high molecular weight. More particularly this invention relates to the separation of crude acrylonitrile and methacrylonitrile from acetonitrile.

Processes and catalysts for the manufacture of acrylonitrile and methacrylonitrile by the ammoxidation of propylene and isobutylene, respectively, have been described in U.S. Patents 3,230,246, 3,200,084, 2,904,580, 3,198,750, 3,200,141, 3,200,081, 3,197,419, 3,186,955.

When an olefin, propylene or isobutylene, for instance, is reacted with ammonia and molecular oxygen to produce the corresponding unsaturated nitrile, such as acrylonitrile or methacrylonitrile, there are also produced small quantities of hydrogen cyanide, saturated aliphatic nitriles such as acetonitrile, and carbonyl compounds of relatively low molecular weight such as acetaldehyde, propionaldehyde, acrolein, methacrolein, acetone, etc. The products of reaction are recovered by absorption in a suitable solvent such as water during which step additional heavy organic compounds are formed.

It is an object of this invention to separate the crude monoolefinically unsaturated nitriles from the crude saturated aliphatic nitriles.

It is a further object of this invention to separate the crude monoolefinically unsaturated nitriles and the crude saturated aliphatic nitriles from the contaminating heavy organic byproducts.

The following general description of the instant invention is specifically with respect to an acrylonitrile plant but is equally applicable, with obvious modifications, to a methacrylonitrile plant.

In above-mentioned U.S. Patent No. 2,904,580, filed Sept. 20, 1957 a process is described for the manufacture of acrylonitrile which comprises the gaseous phase catalytic reaction of propylene, ammonia and molecular oxygen-containing gas. In this vapor phase catalytic reaction preferably carried out in a fluidized bed type reactor, a part of the ammonia which is introduced as feed to the reactor is unreacted and consequently the effluent gases from the reactor contain, in addition to acrylonitrile, a small but nevertheless appreciable amount of ammonia, as well as some unreacted feed materials such as propylene, oxygen and nitrogen. The reactor effluent will also usually contain other reaction products such as hydrogen cyanide, acetonitrile, etc.

Acrylonitrile which is the principal product of the aforesaid process may be recovered from the reactor effluent gases by scrubbing the hot gases with a suitable solvent such as water or a glycol such as ethylene glycol, or a mixture of such solvents, in an absorber or quench tower. This is usually done after briefly heat-exchanging the effluent reactor gases with incoming feed gases and then leading the reactor effluent gases into the bottom of a quench tower in which it is countercurrently scrubbed with dilute acid. Any mineral acid may be used, but it is preferred to use an acid, the ammonium salt of which has good fertilizer value or a ready market. Such preferred acids are phosphoric, nitric, sulfuric and hydrochloric acids. The dilute mineral acid reacts with ammonia and makes it unavailable for the formation of byproducts resulting from the direct reaction of ammonia and acrylonitrile such as $\beta$-aminopropionitrile, $\beta$-$\beta'$-imino dipropionitrile and $\beta$-$\beta'$-$\beta''$-nitrilo tripropionitrile. Despite the speed of the neutralization reaction, some cyanoethylation of the ammonia does take place, as not all the excess ammonia in the reactor effluent gases can be removed quickly enough. As a result, these cyanoethylated products react with other constituents of the reactor effluent stream and from various polymers. Some of them are quite heavy and most of them are characteristically soluble in water, with the result that the stream issuing from the bottom of the quench tower is a dilute water solution of the ammonium salt of the mineral acid used, containing some acrylonitrile and other desirable products of reaction, and contaminated with organic "heavies" in solution. Some of these heavies comprise partially hydrolyzed polyacrylonitrile, polyacrylamide, polymers of unsaturated aldehydes and unsaturated ketones, cyanhydrins and various cyanoethylated byproducts.

In a subsequent step, the overhead from the quench tower is led into an absorber where it is countercurrently contacted with down-flowing lean solvent, preferably water, into which the products of reaction, except for relatively insoluble gases, are absorbed. The non-absorbed gases are led to a stack and disposed of.

Conventionally, the stream from the bottoms of the absorber, known as the rich water stream, is led into an extractive distillation column which is hereinafter referred to as a "recovery column" where it is extractively distilled. The recovery column may be any suitable contacting means in which liquid and vapor are countercurrently contacted in a multiplicity of intercommunicating zones or stages. The overhead vapors from this recovery column are enriched in acrylonitrile, other components being chiefly water and hydrogen cyanide. When these overhead vapors are condensed and collected, the liquid undergoes liquid-liquid phase separation the less dense upper layer being an organic phase, the denser, lower layer being an aqueous solution. The organic phase being chiefly acrylonitrile substantially saturated with water and contaminated with hydrogen cyanide is referred to as "crude" acrylonitrile. The aqueous phase comprising water substantially saturated with acrylonitrile and contaminated with hydrogen cyanide is refluxed to the top of the recovery column.

Further, conventionally, liquid bottoms from the acrylonitrile recovery column, depleted in acrylonitrile, are pumped to an acetonitrile stripper column, about two-thirds the way up the height of the column. A thermosiphon reboiler, in cooperation with a large quantity of live steam injected into the bottom of the stripper column, provides the required heat-duty or "boil-up" in the bottom of the stripper column. The acetonitrile vapors, contaminated chiefly with hydrogen cyanide and saturated with water under the overhead operating conditions of the stripper column, are condensed, a portion being withdrawn and the remaining portion being returned to the top of this stripper column. The liquid bottoms stream from the bottom of the stripper column is mainly water contaminated with organic heavies and various cyanides. A small portion of this stream is withdrawn to waste treatment, the remaining being returned to the absorber as lean water.

I have discovered an improvement of the conventional process described above, comprising withdrawing from near the bottom section of the stripper column a liquid sidestream comprising lean water with the dissolved "heavies" and "cyanides," with substantially no acrylonitrile and hydrogen cyanide and contaminated with acetonitrile, and returning it to the top of the absorber; further, withdrawing from the bottom of the stripper column a liquid bottoms stream substantially free from acetonitrile, recycling the major portion of the liquid bottoms stream to the top of the recovery column, and withdrawing the remainder (hereinafter referred to as "net bottoms") for further treatment.

It has been found that the process of this invention is unexpectedly effective and economical in that it simultaneously provides a recycle stream substantially free of acetonitrile for recycling to the top of the recovery column, at the same time providing a lean water stream substantially free of acrylonitrile for recycling to the top of the absorber.

The following is a more detailed description of a specific embodiment of the instant invention wherein the $\alpha$-$\beta$ monoolefinically unsaturated nitrile is acrylonitrile, the solvent used is water, and the saturated aliphatic nitrile is acetonitrile. The invention may be better understood by reference to the accompanying drawing which, is a process flowsheet showing an acrylonitrile recovery column 1 and a stripper column 2, operated in combination and with auxiliary process equipment to be described hereinafter, to effect the desired separation.

In referring to the figure, it can be seen that the feed stream of "rich water" is introduced into the recovery column 1, at a feed tray shown at 3 which is about two-thirds the way to the top of the recovery column 1 fitted with fractionating plates. Other liquid vapor contacting means such as columns packed with Raschig rings, Berl saddles and the like may be used, but sieve trays are preferred. The vapors distilled overhead are condensed in the vapor condenser 4 and the condensate then passes to the decanter 5 where a phase separation takes place, the organic layer (the crude acrylonitrile phase) being removed for further purification and the water layer (the acrylonitrile-depleted aqueous phase), being returned to the top of the column.

The water layer reflux may be returned at other locations in the recovery column 1. For example, it may be returned to the recovery plate between the feed plate and the top plate. An advantage of introducing the water layer reflux into the recovery column at a location lower than the top plate is that it avoids the build-up of undesirable water-soluble organic components which tend to "flash" on the top plate and consequently accumulate in the water layer reflux loop. It will be apparent to one skilled in the art that the process of this invention would be operable even if the water layer reflux were introduced below the feed tray, but there would be no special reason for doing so. The lower the point of return of the water layer reflux below the feed plate, the more acrylonitrile would have to be stripped out of the bottom section of the column 1.

Other means for separating the organic phase from the aqueous phase of the condensate may be employed. For example, the condensate may be directly flowed through materials such as silica gel, molecular sieves and the like which will preferentially remove water. A liquid-liquid centrifuge may also be used to separate the lighter organic phase from the heavier aqueous phase.

The heat duty required to provide the necessary "boil-up" in the bottom of the recovery column 1 is provided by conventional reboiling, preferably by removing liquid at or near the bottom of the column 1, shown at 6, and heat-exchanging in a thermosiphon reboiler 7. The effluent from the thermosiphon reboiler is returned to the bottom of the recovery column 1 at 8. Live steam 9 may be injected either to supplement or to replace the required heat duty of the recovery column 1. A bottoms stream rich in acetonitrile is led from the recovery column 1 into the stripper column 2 at 10 about two-thirds of the way to the top of the column 2. Overhead vapors from the stripper column 2 are condensed in the vapor condenser 11. The condensate then passes to the decanter 12 where a portion of the condensed crude acetonitrile is removed and the major portion of the condensate is returned to the top of the column 2.

A lean water stream substantially free of acetonitrile is removed as a liquid sidestream at 13 in the lower third of the column 2, and returned to the top of the absorber not shown in the figure. The major portion of the bottoms of the stripper column 2 are removed at 17 and returned to the top of the recovery column 1 as solvent water recycled. The remainder, which is not bottoms, are led to waste treatment.

Both the recovery column 1 and the stripper column 2 may be reboiled by heat exchange with any hot fluid. Condensing steam as the transfer medium in the thermosiphon reboiler is a preferred method of reboiling the columns. In addition, live steam may be injected directly into the columns either to supplement or to replace the heat duty provided by the reboilers.

The extractive distillation in the recovery column 1 may be carried out under reduced pressure or under pressure. Operation of the recovery column 2 so as to generate a pressure in the range from about 1 pound per square inch gauge (p.s.i.g.) to about 5 p.s.i.g. in the top of the column is preferred. The stripper column 2 may likewise be operated under reduced pressure or under pressure. Operation of the stripper column 2 so as to generate a pressure in the range from about 1 p.s.i.g. to about 15 p.s.i.g. is preferred.

As a specific illustration of the process embodied herein and illustrated in the figure, the extracted distillation was carried out in a 70-plate recovery column 1, in combination with a 60-plate stripper column 2, the feed to column 1 being rich water of the composition shown in Table 1.

The rich water feed was introduced continuously on the 40th plate (the bottom plate being numbered 1) of the recovery column 1. The down-flowing rich water is contacted countercurrently with up-flowing vapors generated near the bottom of the recovery column 1, by heat supplied to the reboiler 7. The quantity of heat supplied to the thermosiphon reboiler 7 is a function of, among other factors, the quantity of rich water introduced and the separation required of the column 1, and may be readily computed by one skilled in the art. Heat was supplied to the thermosiphon reboiler 7 from low pressure steam in the range of 30 to 50 p.s.i.g.

Overhead vapors from the recovery column 1 are led into the vapor condenser 4 and the condensate is collected in the decanter 5. It is preferred to use a horizontal baffle decanter so that the less dense organic phase flows over the baffle and is led away as crude acrylonitrile. The more dense aqueous phase is water substantially saturated with acrylonitrile and contaminated with HCN, and is led to the top of the recovery column 1. An inert gas blanket comprising natural gas is continuously fed into the vapor space above the liquid level and is continuously bled away to a flare. Composition of the liquid streams are shown in Table 1.

A liquid bottoms stream was continuously withdrawn from the bottom of the column 1 and led onto the 50th plate (bottom plate numbered 1) of the stripper column 2. The up-flowing vapors in the column 2 are contacted countercurrently by down-flowing liquid reflux. Overhead vapors from the stripper column 2 are condensed in the vapor condenser 11 and collected in the decanter 12.

The major portion of the condensed acetonitrile liquid is refluxed to the top of the stripper column 2 the remainder being withdrawn for further purification. A liquid sidestream is removed at 13 at plate 10 of the column 2. This liquid stream is water substantially free from acrylonitrile and is returned to the absorber as lean water. The composition of this lean water stream to the absorbers is given in Table 1. It will be noted that the concentration level of acetonitrile at the 10th plate is more than one hundred times the concentration of acetonitrile in the bottom of the stripper column and this unexpectedly high ratio is maintained with a liquid draw-off as low as about 30% of the total liquid down-flow onto plate 10, it being apparent to one skilled in the art that higher liquid draw-offs will increase the ratio.

The reboiler duty required to provide the necessary boil-up in the bottom of the stripper column 2 is provided by condensing steam in a thermosiphon reboiler 14, effluent vapors from which are returned to the bottom of the column 2 at 15. About one-half the total heat duty required to provide the necessary boil-up in the bottom of the stripper column 2 is supplied by direct injection of live 40 pounds per square inch gauge (p.s.i.g.) steam into the bottom of the stripper column 2. Bottoms from the stripper column 2 are removed at 17 the major portion of this bottoms stream being led to the top of the recovery column 1 as a solvent water recycled, the composition of which is shown in Table 1. The remaining portion of the bottoms stream from the column 2 is led to waste treatment as net bottoms.

The pressure in the top of the recovery column 1 was about 2 p.s.i.g. and the temperature about 195° F. The pressure in the top of the stripper column 2 was about 8 p.s.i.g. and the temperature about 193° F.

(g) withdrawing from the lowest of said countercurrent stages a second solvent stream, recycling the major portion of said second stream to a stage in the upper half of said extractive distillation stages and disposing of the remainder.

2. The process of claim 1 wherein said solvent is at least one member selected from the group consisting of water and ethylene glycol.

3. In the process of claim 1 comprising, following step (c) returning the solvent phase depleted in unsaturated nitrile to a stage in the upper half of said extractive distillation stages as reflux and following step (e) returning the major portion of said condensed acetonitrile vapors to the uppermost stage of said stripping stages.

4. The process of claim 2 wherein said solvent is water, said liquid obtained from step (a) comprises from about 1 to about 10 percent of said $\alpha$-$\beta$ monoolefinically unsaturated nitrile and from about 0.1 to about 5 percent acetonitrile, said first lean solvent stream comprises from about 0 to about 1 percent of said unsaturated nitrile and from about 1 part per million (p.p.m.) to about 2 percent by weight acetonitrile, said second solvent stream comprises from about 0 to about 100 p.p.m. of said unsaturated nitrile and from 0 to about 500 p.p.m. acetonitrile, and wherein the concentration of acetonitrile in

TABLE I [1]

|  | Rich Water | Recovery Column Overhead | Crude Acrylonitrile | Recovery Column Water Reflux | Absorber [2] Lean Water | Solvent Water | Crude Acetonitrile |
|---|---|---|---|---|---|---|---|
| Acrylonitrile | 5.53 | 51.3 | 79.687 | 8.435 |  |  |  |
| Acetonitrile | 0.684 |  |  |  | 145 p.p.m. | 1 p.p.m. | 76.52 |
| Hydrogen Cyanide | 1.03 | 8.53 | 12.65 | 0.935 |  |  | 7.06 |
| Propionitrile | 0.0172 | 0.15 | 0.233 |  |  |  |  |
| Acrolein | 0.0418 |  |  |  |  |  |  |
| Water | 88.0638 | 40.02 | 7.43 | 90.63 | 95.0 | 95.01 | 16.42 |
| Heavies | 3.61 |  |  |  | 3.9 | 3.89 |  |
| Cyanides | 1.0232 |  |  |  | 1.1 | 1.10 |  |

[1] The Table I above shows percentage composition by weight, except as shown.
[2] This stream is taken from Plate 10 of the stripper column.

I claim:
1. In the process for separating acetonitrile from an $\alpha$-$\beta$ monoolefinically unsaturated nitrile in solution, the improvement comprising:
   (a) absorbing a mixture comprising acetonitrile and said unsaturated nitrile in a solvent
   (b) feeding the liquid obtained from (a) into a stage in the upper half of a multiplicity of intercommunicative extractive distillation stages
   (c) condensing vapors removed overhead from said stages, removing crude unsaturated nitrile from the condensed overhead vapors withdrawn from the uppermost of said extractive distillation stages
   (d) withdrawing a liquid from the lowest of said extractive distillation stages and introducing it into a stage in the upper half of a multiplicity of intercommunicating countercurrent contacting stripping stages
   (e) withdrawing overhead vapors from the uppermost of said countercurrent stages, condensing said vapors and recovering crude acetonitrile from the condensed acetonitrile vapors
   (f) withdrawing from the lower section of said countercurrent stages a first lean solvent stream and returning said stream to (a) and said first lean solvent stream is greater than the concentration of acetonitrile in said second solvent water stream.

5. The process of claim 4 wherein said $\alpha$-$\beta$ monoolefinically unsaturated nitrile is acrylonitrile.

6. The process of claim 4 wherein said $\alpha$-$\beta$ monoolefinically unsaturated nitrile is methacrylonitrile.

References Cited

UNITED STATES PATENTS

| 2,325,379 | 7/1943 | Durrum | 203—84 |
| 2,350,256 | 5/1944 | Shiras et al. | 203—84 |
| 3,201,918 | 8/1965 | Sennewald et al. | 260—465.9 |
| 3,210,399 | 10/1965 | Krzemicki | 260—465.9 |
| 3,264,197 | 8/1966 | Schonbeck et al. | 203—85 |

FOREIGN PATENTS 984,725  3/1965  Great Britain.

NORMAN YUDKOFF, *Primary Examiner.*

W. L. BASCOMB, JR., *Assistant Examiner.*